US007678413B2

(12) United States Patent
Amita et al.

(10) Patent No.: US 7,678,413 B2
(45) Date of Patent: Mar. 16, 2010

(54) MONOCLINIC CETI$_2$O$_6$ THIN FILM AND SOL-GEL PROCESS FOR THE PREPARATION THEREOF

(75) Inventors: Verma Amita, New Delhi (IN); Agnihotry Suhasini Avinash, New Delhi (IN); Bakhshi Ashok Kumar, New Delhi (IN)

(73) Assignee: Council of Scientific & Industrial Research, New Delhi (IN)

( * ) Notice: Subject to any disclaimer, the term of this patent is extended or adjusted under 35 U.S.C. 154(b) by 959 days.

(21) Appl. No.: 11/394,203

(22) Filed: Mar. 31, 2006

(65) Prior Publication Data
US 2007/0190361 A1 Aug. 16, 2007

(30) Foreign Application Priority Data
Feb. 13, 2006 (IN) ........................ 392/DEL/2006

(51) Int. Cl.
*B05D 5/12* (2006.01)
*B05D 3/12* (2006.01)
(52) U.S. Cl. .................. 427/126.2; 427/126.3; 427/240
(58) Field of Classification Search ................. 427/240, 427/126.2, 126.3
See application file for complete search history.

(56) References Cited

OTHER PUBLICATIONS

Verma et al., "Variations in the structural, optical and electrochemical properties of CeO2-TiO2 films as a function of TiO2 content", Applied Surface Science, vol. 252, 2006, pp. 5131-5142.*
Verma et al., "Sol-gel derived nanocrystalline CeO2-TiO2 coatings for electrochromic windows", Solar Energy Materials & Solar Cells, vol. 86, 2005, pp. 85-103.*
Verma et al., "Optimization of CeO2-TiO2 composition for fast switching kinetics and improved Li ion storage capacity", Solid State Ionics, vol. 171, 2004, pp. 81-90.*

* cited by examiner

*Primary Examiner*—Kirsten C Jolley
(74) *Attorney, Agent, or Firm*—Harold L. Novick; The Nath Law Group (57) ABSTRACT

A monoclinic CeTi$_2$O$_6$ thin film and a sol-gel process for the deposition of CeTi$_2$O$_6$ thin films, which has applications as passive counter electrodes in electrochromic devices, sensors and photocatalytic agent is presented. This film can be obtained by spin coating a solution, which comprises both titanium and cerium precursors on to electrically conducting or insulating glass substrates and annealing at a temperature of 600° C. for 5 min. in air. The Ce:Ti mole ratio in the deposition sol for the preparation of the film is identified in the range of 0.4:1 and 0.6:1.

8 Claims, 5 Drawing Sheets

MONOCLINIC CeTi$_2$O$_6$ THIN FILM AND SOL-GEL PROCESS FOR THE PREPARATION THEREOF

FIELD OF THE INVENTION

The present invention relates to a monoclinic CeTi$_2$O$_6$ thin film form and a sol-gel process for the preparation thereof.

BACKGROUND OF THE INVENTION

In the developmental process of WO$_3$ based transmissive ECDs, we are concentrating our efforts for developing ion storage counter electrode films with a high transmittance for visible light both in the charged and discharged state and an ion storage capacity exceeding 20 mCcm$^{-2}$ or comparable to WO$_3$ to provide sufficient number of ions for deep colouration. Therefore, work has been undertaken in this direction for the synthesis of CeO$_2$ precursors doped with TiO$_2$ via a wet chemistry route.

Counter electrodes in transmissive electrochromic devices (ECDs) can be of two types. The first one involves an electrochromic (EC) layer, which is complementary with the chosen electrochromic material. The combination of WO$_3$ with NiO$_x$H$_y$ is such typical example. The second possibility is an optically passive counter electrode, which remains colorless in both oxidized and reduced states.

Whether active or passive the counter electrode has also to balance the charge shuttled from the active EC film through the ionic conductor—the electrolyte-layer. Thus the ion storage capacity of the counter electrode should equal the ion storage capacity of EC WO$_3$. Good cycling stability within the operational voltage and temperature range of the ECDs and high transmittance are other requirements of a counter electrode.

Among optically passive counter electrode materials In$_2$O$_3$: Sn has been reported as a candidate. Although it can be used also as a transparent conducting electrode its intercalation reaction is only partially reversible. Another material, which has been investigated extensively, is vanadium pentoxide (V$_2$O$_5$). It has high Li$^+$ storage capacity, reversible intercalation kinetics for lithium, but the transmission in its bleached state is low. Tin oxide doped with different dopants like Mo and Sb has also been studied as a candidate for a passive counter electrode, but instability of SnO$_2$ towards Li$^+$ intercalation and the likely reaction leading to the formation of SnO, Sn and Li$_2$O prompted exploratory work on other suitable materials for ECDs.

In comparison with the above-mentioned materials, CeO$_2$ appears to be more promising optically passive counter electrode material. The reversibility of the lithium ion intercalation reaction in CeO$_2$ is reasonably good but the reaction kinetics is very slow as shown by D. Keomany, C. Poinsignon, D. Deroo. in *Sol. Energy Mater. Sol. Cells* 33 (1994) 429-44. Several attempts have been made in order to improve the reaction kinetics by way of mixing the oxide with other materials such as Ti, Zr, V, Sn, Mo and Si individually or with their mixtures.

Films of pure and doped CeO$_2$ have been made by different techniques. Sputtering technique has been adopted by M. Veszelei, L. Kullman, C. G. Granqvist, N. V. Rottkay, and M. Rubin in *Appl. Opt.*, 37 (1998) 5993-6001 and the films thus obtained have been extensively studied. The potential of such films as passive counter electrodes has been reported. However, these authors have not obtained and reported the formation of CeTi$_2$O$_6$ compound in the thin film form. It is noteworthy that the application of CeO$_2$—TiO$_2$ mixed oxide films as passive counter electrodes has been shown by several authors. However, the potential of CeTi$_2$O$_6$ thin films as passive counter electrodes has never been reported earlier. Therefore, the present invention is the first report on the application of these films as passive counter electrodes for electrochromic devices.

The widely used sol-gel process offers numerous advantages over the other conventional deposition techniques, which include tailor making of the film's properties, introduction of porosity in the films, low process cost and possible processing at low temperature. Preparation of CeO$_2$ based films by sol-gel technique has been attempted following various routes. The use of alkoxides, the most popular precursor material in sol-gel processing has been reported by D. Keomany, C. Poinsignon, D. Deroo. in *Sol. Energy Mater. Sol. Cells* 33 (1994) 429-441. Alternately salts of cerium like CeCl$_3$.7H$_2$O, [(NH$_4$)$_2${Ce(NO$_3$)$_6$}] in combination with Ti alkoxides have been shown by A. Makishima, M. Asami and K. Wada, in *J. Non-Cryst. Solids* 121 (1990) 310-314 as one of the routes to get CeO$_2$—TiO$_2$ films. Based on the earlier reports on these materials, A. Makishima, M. Asami and K. Wada, in *J. Non-Cryst. Solids* 121 (1990) 310-314 have performed a study in which the type of alkoxyl group of titanium alkoxide and the kind of catalyst have been varied in order to study their influence on the properties of the films. The films deposited by the authors have been annealed at 500° C. and the XRD patterns of the films are characterized by the appearance of diffraction peaks of the CeO$_2$ phase alone.

Metal oxide semiconductors are used for gas sensing due to the dependence of their electrical conductivity on the ambient gas composition. They offer the possibility of "tailoring" the sensitivity and selectivity towards specific gas species. Gaining increased attention are mixed metal oxide compounds whereby varying the composition of the constituents, the sensor performance can be modified, i.e. improvement of sensitivity and selectivity, fabrication of n- and/or p-type semiconductor and modification of the sensor resistance for ease of electronic interface. Because of its chemical stability and high diffusion coefficient of oxygen vacancies, CeO$_2$ is a promising material for fast oxygen gas sensing at high temperatures as reported by F. Millot, De Mierry in *J. Phys. Chem. Solids* 46 (1985) 797-801. TiO$_2$ has been widely reported by A. Rothschild, F. Edelman, Y. Komen, F. Cosandey, in *Sensors and Actuators B* 67 (2000) 282-289, N. O. Savage, S. A. Akbar, P. K. Dutta, in *Sensors and Actuators B* 72 (2001) 239-248 and C. Garzella, E. Comini, E. Tempesti, C. Frigeri, G. Sberveglieri in *Sensors and Actuators B* 68 (2000) 189-196 for its gas sensing properties towards oxygen, carbon monoxide, methanol and ethanol and humidity. Mixed CeO$_2$—TiO$_2$ films deposited using a sol-gel process involving ceric ammonium nitrate and titanium butoxide have been reported to be oxygen gas sensors by A. Trinchi, Y. X. Li, W. Wlodarski, S. Kaciulis, L. Pandolfi, S. Viticoli, E. Comini, G. Sberveglieri in *Sensors and Actuators B* 95 (2003) 145-150.

Photocatalytic reaction sensitized by TiO$_2$ and other semiconducting materials has attracted extensive interest as a potential way of solving energy and environmental issues. Several cerium titanates in the powdered form have been investigated for photocatalytic activity. Yellow colored cerium titanate, CeTi$_2$O$_6$ with mainly Ce$^{4+}$ state is known to cause photobleaching of methylene blue aqueous solution with irradiation of Xe discharge light as reported by S. O-Y-Matsuo, T. Omata, M. Yoshimura in *J. Alloys and Compounds*, 376 (2004) 262-267. Mixed CeO$_2$—TiO$_2$ films deposited using R.F and D.C sputtering are reported by Q. N.

Zhao, C. L. Li, X. J. Zhao in *Key Engineering Materials* 249 (2003) 451-456 to decolorize methyl orange solutions upon irradiation of the UV light.

Brannerite, $UTi_2O_6$ is an accessory phase in the titanate-based crystalline ceramics of synroc as reported by A. E. Ringwood, S. E. Kession, N. G. Ware, W. Hibberson, A. Major in *Nature* (*London*) 278 (1979) 219. The high U-content of brannerite (up to 62.8 wt. %) and its potential as a nuclear waste form for the immobilization of actinides have emphasized the importance of understanding radiation damage effects and their relation to composition and structure. The ideal formula of natural brannerite is $(U,Th)_{1-x}Ti_{2+x}O_6$ with a deficiency in uranium and excess titanium. Many cation substitutions have been identified for both uranium (Pb, Ca, Th, Y and Ce) and titanium (Si, Al, Fe) in natural brannerite. Ideally, stoichiometric brannerite is monoclinic with space group C2/m. There are two different distorted octahedra in the structure. Distorted $TiO_6$ octahedra form a zigzag sheet by sharing common edges, and each Ti octahedron shares three edges with titanium octahedral and three corners with uranium octahedra. The sheets of $TiO_6$ octahedral are identical with those of the anatase structure parallel to (101) plane. The large cations (Th,U) are located at the interlayer sites and connect adjacent sheets. Each uranium octahedron shares two common edges with neighboring $UO_6$ octahedra and four corners with $TiO_6$ octahedra. Oxygen atoms exist in a distorted HCP (hexagonal closely packed) array. Ce can substitute onto the U-site with little distortion of the octahedra. Ce is commonly used to estimate the properties of solids containing plutonium owing to their similar ionic radii (Ce (IV)=0.087 nm; Pu(IV=0.086 nm)). The compound $CeTi_2O_6$ is isostructural with $PuTi_2O_6$. As has been reported by K. B. Helean, A. Navrotsky, G. R. Lumpkin, M. Colella, J. Lian, R. C. Ewing, B. Ebbinghaus and J. G. Catalano in *J. Nucl. Mater.* 320 (2003) 231-244, $CeTi_2O_6$ in the powdered form prepared by sintering in air at 1350° C. for>100 h a pellet containing stoichiometric portions of the oxides, $CeO_2$ and $TiO_2$ is used to estimate the properties of $PuTi_2O_6$.

In the present invention, the $CeTi_2O_6$ phase has been achieved in thin film by the sol-gel technique, which represents a reliable, low-cost chemical route. In comparison to the powdered $CeTi_2O_6$ material, which is formed at 1400-1500° C., the corresponding thin film is prepared by the sol-gel process at 600° C. in the present invention. Our literature survey has shown that the preparation of $CeTi_2O_6$ in thin film form has never been carried out before. $CeTi_2O_6$ in powdered form has applications in areas of e.g. immobilization of nuclear waste form and photocatalytic activity. However, the same material in thin film form is useful in applications such as passive counter electrodes, sensors and photocatalytic activity. We have prepared $CeTi_2O_6$ films with a high transmittance for visible light both in the charged and discharged state and an ion storage capacity exceeding 20 $mCcm^{-2}$. Using cerium chloride heptahydrate and titanium propoxide precursors, we have reported earlier in *Sol. Ener. Mater. Sol. Cells* 86 (2005) 85-103, the formation of a mixed compound of $CeO_2$ and $TiO_2$ i.e. $CeO_{1.6}.2TiO_2$ at annealing temperature of 500° C. from the Ce:Ti compositions, 4:1 and 2:1. It is evident from the chemical formula of the aforesaid compound that the oxygen content and thus the stoichiometric compositions of the two compounds i.e. $CeO_{1.6}.2TiO_2$ and $CeTi_2O_6$ are different. A comparative chart showing the results reported in the published papers and the present patent is given in Table I.

TABLE I

A comparative chart showing the process steps, products obtained and the application of the films derived from different Ce:Ti compositions.

| Ce:Ti mole ratio | Process steps | Product(s) obtained | Application(s) |
|---|---|---|---|
| 4:1 | a) preparing an 0.22 M alcoholic solution of cerium chloride heptahydrate in absolute ethanol;<br>b) adding the solution prepared in step a) to titanium propoxide to obtain a final solution containing Ce:Ti mole ratio of 4:1;<br>c) stirring the mixture obtained in b);<br>d) after aging the solution as obtained in c) for a period of one week, spin coating the solution on electrically conducting substrates and micro slide glass at 3000 rpm for a duration of 35 s;<br>e) after initially drying the film deposited in d) for 5 min. annealed the film in air at 500° C. | (Prior-art)<br>$CeO_2$ and $CeO_{1.6}.2TiO_2$<br>(crystallite size: 6.2 nm)<br>{A. Verma, S. B. Samanta, N. C. Mehra, A. K. Bakhshi, S. A. Agnihotry in Sol. Ener. Mater. Sol. Cells 86 (2005) 85-103, A. Verma, Amish G. Joshi, A. K. Bakhshi, S. M. Shivaprasad, S. A. Agnihotry in Appl. Surf. Sci. (article in press)}. | As a passive counter electrode. |
| 2:1 | a) preparing an 0.22 M alcoholic solution of cerium chloride heptahydrate in absolute ethanol;<br>b) adding the solution prepared in step a) to titanium propoxide to obtain a final solution containing Ce:Ti mole ratio of 2:1;<br>c) stirring the mixture obtained in b);<br>d) after aging the solution as obtained in c) for a period of one week, spin coating the solution on electrically conducting substrates and micro slide glass at 3000 rpm for a duration of 35 s;<br>e) after initially drying the film deposited in d) for 5 min. annealed the film in air at 500° C. | (Prior-art)<br>$CeO_2$ and $CeO_{1.6}.2TiO_2$<br>(crystallite size: 9.2 nm)<br>{A. Verma, S. B. Samanta, N. C. Mehra, A. K. Bakhshi, S. A. Agnihotry in Sol. Ener. Mater. Sol. Cells 86 (2005) 85-103, A. Verma, Amish G. Joshi, A. K. Bakhshi, S. M. Shivaprasad, S. A. Agnihotry in Appl. Surf. Sci. (article in press)}. | As a passive counter electrode. |
| 1.33:1 | a) preparing an 0.22 M alcoholic solution of cerium chloride heptahydrate in absolute ethanol; | (Prior-art)<br>$CeO_2$ and $CeO_{1.6}.2TiO_2$ | As a passive counter |

TABLE I-continued

A comparative chart showing the process steps, products obtained and the application of the films derived from different Ce:Ti compositions.

| Ce:Ti mole ratio | Process steps | Product(s) obtained | Application(s) |
|---|---|---|---|
|  | b) adding the solution prepared in step a) to titanium propoxide to obtain a final solution containing Ce:Ti mole ratio of 1.33:1;<br>c) stirring the mixture obtained in b);<br>d) after aging the solution as obtained in c) for a period of one week, spin coating the solution on electrically conducting substrates and micro slide glass at 3000 rpm for a duration of 35 s;<br>e) after initially drying the film deposited in d) for 5 min. annealed the film in air at 500° C. | {A. Verma, S. B. Samanta, N. C. Mehra, A. K. Bakhshi, S. A. Agnihotry in Sol. Ener. Mater. Sol. Cells 86 (2005) 85-103}. | electrode. |
| 1:1 | a) preparing an 0.22 M alcoholic solution of cerium chloride heptahydrate in absolute ethanol;<br>b) adding the solution prepared in step a) to titanium propoxide to obtain a final solution containing Ce:Ti mole ratio of 1:1;<br>c) stirring the mixture obtained in b);<br>d) after aging the solution as obtained in c) for a period of one week, spin coating the solution on electrically conducting substrates and micro slide glass at 3000 rpm for a duration of 35 s;<br>e) after initially drying the film deposited in d) for 5 min. annealed the film in air at 500° C. | (Prior-art) Amorphous {A. Verma, S. B. Samanta, N. C. Mehra, A. K. Bakhshi, S. A. Agnihotry in Sol. Ener. Mater. Sol. Cells 86 (2005) 85-103, A. Verma, Amish G. Joshi, A. K. Bakhshi, S. M. Shivaprasad, S. A. Agnihotry in Appl. Surf. Sci. (article in press)}. | As a passive counter electrode. |
| 0.33:1 | a) preparing an 0.22 M alcoholic solution of cerium chloride heptahydrate in absolute ethanol;<br>b) adding the solution prepared in step a) to titanium propoxide to obtain a final solution containing Ce:Ti mole ratio of 0.33:1;<br>c) stirring the mixture obtained in b);<br>d) after aging the solution as obtained in c) for a period of one week, spin coating the solution on electrically conducting substrates and micro slide glass at 3000 rpm for a duration of 35 s;<br>e) after initially drying the film deposited in d) for 5 min. annealed the film in air at 500° C. | (Prior-art) Amorphous {A. Verma, Amish G. Joshi, A. K. Bakhshi, S. M. Shivaprasad, S. A. Agnihotry in Appl. Surf. Sci. (article in press)}. | As a passive counter electrode. |
| 0.6:1 | a) preparing an 0.22 M alcoholic solution of cerium chloride heptahydrate in absolute ethanol;<br>b) adding the solution prepared in step a) to titanium propoxide to obtain a final solution containing Ce:Ti mole ratio of 0.6:1;<br>c) stirring the mixture obtained in b) for a period of 5 min;<br>d) after aging the solution as obtained in c) for a period of one week, spin coating the solution on electrically conducting substrates and micro slide glass at 3000 rpm for a duration of 35 s;<br>e) after initially drying the film deposited in d) for 5 and 15 min, annealed the film in air at 500 and 600° C. respectively. | (Present invention)<br>a) Amorphous at annealing temperature of 500° C.<br>b) $CeTi_2O_6$ phase at annealing temperature of 600° C. | a) As a passive counter electrode upon annealing at 500° C.<br>b) As passive counter electrode, sensor, and a photocatalytic agent upon the formation of $CeTi_2O_6$ phase at annealing temperature of 600° C. |
| 0.5:1 | a) preparing an 0.22 M alcoholic solution of cerium chloride heptahydrate in absolute ethanol;<br>b) adding the solution prepared in step a) to titanium propoxide to obtain a final solution containing Ce:Ti mole ratio of 0.5:1;<br>c) stirring the mixture obtained in b) for a period of 5 min;<br>d) after aging the solution as obtained in c) for a period of one week, spin coating the solution on electrically conducting substrates and micro slide glass at 3000 rpm for a duration of 35 s;<br>e) after initially drying the film deposited in d) for 5 and 15 min, annealed the film in air at 500 and 600° C. respectively. | (Present invention)<br>a) Amorphous at annealing temperature of 500° C.<br>b) $CeTi_2O_6$ phase at annealing temperature of 600° C. | a) As a passive counter electrode upon annealing at 500° C.<br>b) As passive counter electrode, sensor, and a photocatalytic agent upon the formation of $CeTi_2O_6$ phase at annealing temperature of 600° C. |
| 0.4:1 | a) preparing an 0.22 M alcoholic solution of cerium chloride heptahydrate in absolute ethanol;<br>b) adding the solution prepared in step a) to titanium propoxide to obtain a final solution containing Ce:Ti mole ratio of 0.4:1;<br>c) stirring the mixture obtained in b) for a period of 5 min;<br>d) after aging the solution as obtained in c) for a period of one week, spin coating the solution on electrically conducting substrates and micro slide glass at 3000 rpm for a duration of 35 s; | (Present invention)<br>a) Amorphous at annealing temperature of 500° C.<br>b) $CeTi_2O_6$ phase at annealing temperature of | a) As a passive counter electrode upon annealing at 500° C.<br>b) As passive counter electrode, |

TABLE I-continued

A comparative chart showing the process steps, products obtained and the application of the films derived from different Ce:Ti compositions.

| Ce:Ti mole ratio | Process steps | Product(s) obtained | Application(s) |
|---|---|---|---|
| | e) after initially drying the film deposited in d) for 5 and 15 min, annealed the film in air at 500 and 600° C. respectively. | 600° C. | sensor, and a photocatalytic agent upon the formation of $CeTi_2O_6$ phase at annealing temperature of 600° C. |

OBJECTIVES OF THE INVENTION

The main object of the present invention is to provide monoclinic $CeTi_2O_6$ phase in thin film form.

Another object is to provide a sol-gel process for the preparation of monoclinic $CeTi_2O_6$ phase in thin film form, which obviates the drawbacks as detailed above.

Yet another object of the present invention is to have a process, which will result in films with high chemical and mechanical stability.

Yet another object of the present invention is to prepare films having pure $CeTi_2O_6$ as the only phase and without any other phase coexisting.

Yet another object of the present invention is to deposit films with high ion storage capacity and transmittance characteristics.

Still another object of the present invention is to use a process, which involves small number of steps.

SUMMARY OF THE INVENTION

Accordingly the present invention provides a monoclinic $CeTi_2O_6$ thin film having the following characteristics:

a) pore size of the film in the range of 200-300 nm,
b) crystalline size of 4.5-16 nm,
c) transmission of 75-80% at 550 nm,
d) transmission modulation of <1% at 550 nm,
e) refractive index of about 1.99
f) indirect bandgap of about 3.25 eV and
g) ion storage capacity of 19-23 $mCcm^{-2}$, The present invention further provides a sol-gel process for the preparation of monoclinic $CeTi_2O_6$ thin film form, the said process comprising the steps of:

a) preparing an alcoholic solution of about 0.20-0.25 M cerium chloride heptahydrate in absolute ethanol,
b) adding the solution prepared in step a) to titanium propoxide having concentration in the solution in the range of 0.331-0.624 M, followed by stirring for a period of 4-10 min and aging at 20-30° C. for a period of about one week,
c) spin coating the above said aged solution on electrically conducting substrate or micro slide glass, followed by air drying for a period of about 10-20 min. and annealing the afore said film in air, at a temperature in the range of 580-620° C. for a period of 5-10 min. to obtain the desired monoclinic $CeTi_2O_6$ thin film.

In an embodiment of the present invention the strength of the cerium chloride heptahydrate solution is 0.22 M.

In yet another embodiment the concentration of titanium propoxide in the solution is in the range of 0.372-0.559 M.

In yet another embodiment the Ce:Ti mole ratio used is in the range of 0.4:1 to 0.6:1.

In yet another embodiment the solution obtained in step b) used for making film is in the state of just commencing to become a gel.

In yet another embodiment the aged solution used obtained in step b) is spin coated at 3000 rpm for 35 s.

In yet another embodiment the deposited films are dried in air for 15 min.

In yet another embodiment the films are annealed at 600° for 5 min.

In still another embodiment the conducting substrate used is fluorine doped tin oxide coated glass.

Novelty

In comparison to the powdered $CeTi_2O_6$ material reported earlier in the prior art, which is formed at 1400-1500° C., the corresponding thin film of $CeTi_2O_6$ material is prepared in the present invention by the sol-gel process at 600° C.

Inventive Steps:

1. To obtain $CeTi_2O_6$ compound in thin film form, the Ce:Ti mole ratio in the sol lies in the range of 0.4:1 to 0.6:1.
2. The other important parameter, which governs the formation of this compound in thin film form, is the temperature range. The optimum temperature to obtain this product is 600° C. The annealing is carried out in air at this temperature for 5 min. Below 580° C., the $CeTi_2O_6$ compound has not been obtained in thin film form.

The Main Advantages of the Present Invention Are:

1. Small number (four) of steps is required for the deposition of the films.
2. The preparation of sol used for the deposition of films takes very less time.
3. The formation of $CeTi_2O_6$ phase in thin film form makes its use as a photocatalytic agent much easier. Conventional powder catalysts suffer from disadvantages in stirring during the reaction and in separation after the reaction. Preparation of the catalysts coated as thin films makes it possible to overcome these disadvantages.

4. In contrast to the powdered $CeTi_2O_6$ material, which requires annealing of $CeO_2$ and $TiO_2$ in the range of 1400-1500° C., the $CeTi_2O_6$ film can be obtained at much lower temperature i.e. 600° C.
5. These films find applications in areas of e.g. passive counter electrodes, sensors, and photocatalytic activity.

DETAILED DESCRIPTION OF THE INVENTION

The initial clear, colorless solution of cerium chloride heptahydrate is prepared by stirring the cerium salt in absolute ethanol until the salt dissolves completely. The solution is prepared at ambient temperature. Ti alkoxides readily hydrolyze in aqueous and alcoholic solutions. The addition of cerium based alcoholic solution to titanium propoxide such that Ce:Ti mole ratio is between 0.4:1 and 0.6:1 does not induce precipitation into the titanium propoxide. The cerium salt stabilizes the alkoxide solution and prevents the precipitation of the hydroxides. The gelation time of the solution varies depending on the content of Ti alkoxide in the solution. The gelation time for Ce:Ti mole ratio (0.6:1, 0.5:1 and 0.4:1) solutions is approximately one week depending on the ambient temperature and humidity conditions.

For electrochromic applications, a high transparency in the films is a prerequisite. The films deposited from the solutions just reaching the state of gelation are highly transparent due to higher degree of porosity in them. The hydrolysis and condensation in the sols results in the elimination of small groups such as $H_2O$, $C_2H_5OH$ etc, thereby leading to highly porous and thus transparent films.

Therefore, after appropriate aging of the sol depending upon its ratio of precursor materials and annealing of the deposited films, high transmittance in the films can be obtained.

The deposition sols after optimum aging have been spin coated onto electrically conducting (fluorine doped tin oxide, $SnO_2$:F) and micro slide glass at 3000 rpm for 35 s. After intermittently drying the films for 15 min., the films have been thermally treated at 600° C. for 5 min. in air in a furnace at the heating rate of 1-2° $C.min^{-1}$.

Ce:Ti (0.6:1, 0.5:1 and 0.4:1) solutions based on cerium chloride heptahydrate and titanium propoxide have been prepared by dissolving the alkoxide in 0.22 M cerium chloride solution.

The following examples illustrate the preparation of sol preferred for the deposition of $CeTi_2O_6$ films and should not be construed to limit the scope of the present invention.

EXAMPLE 1

Figure 1:
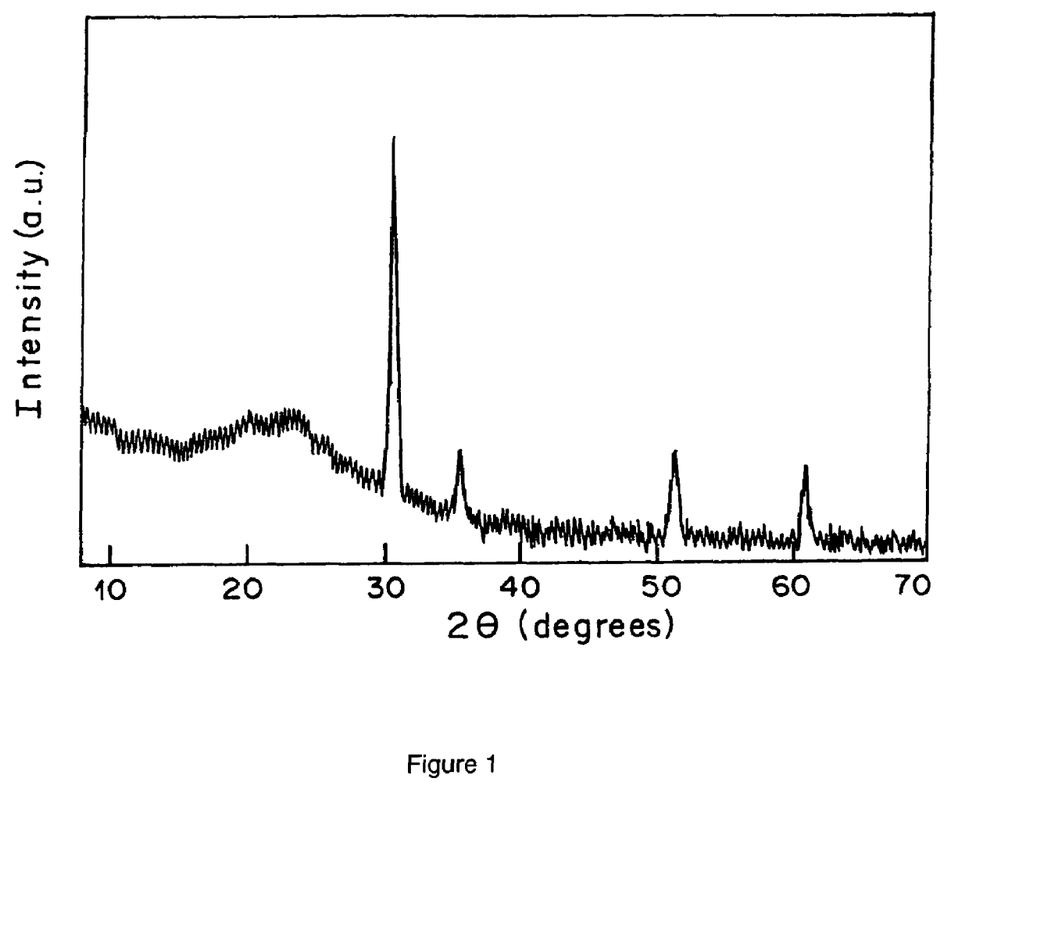
FIG. 1 represents the XRD pattern of the $CeTi_2O_6$ film.
Figure 2:
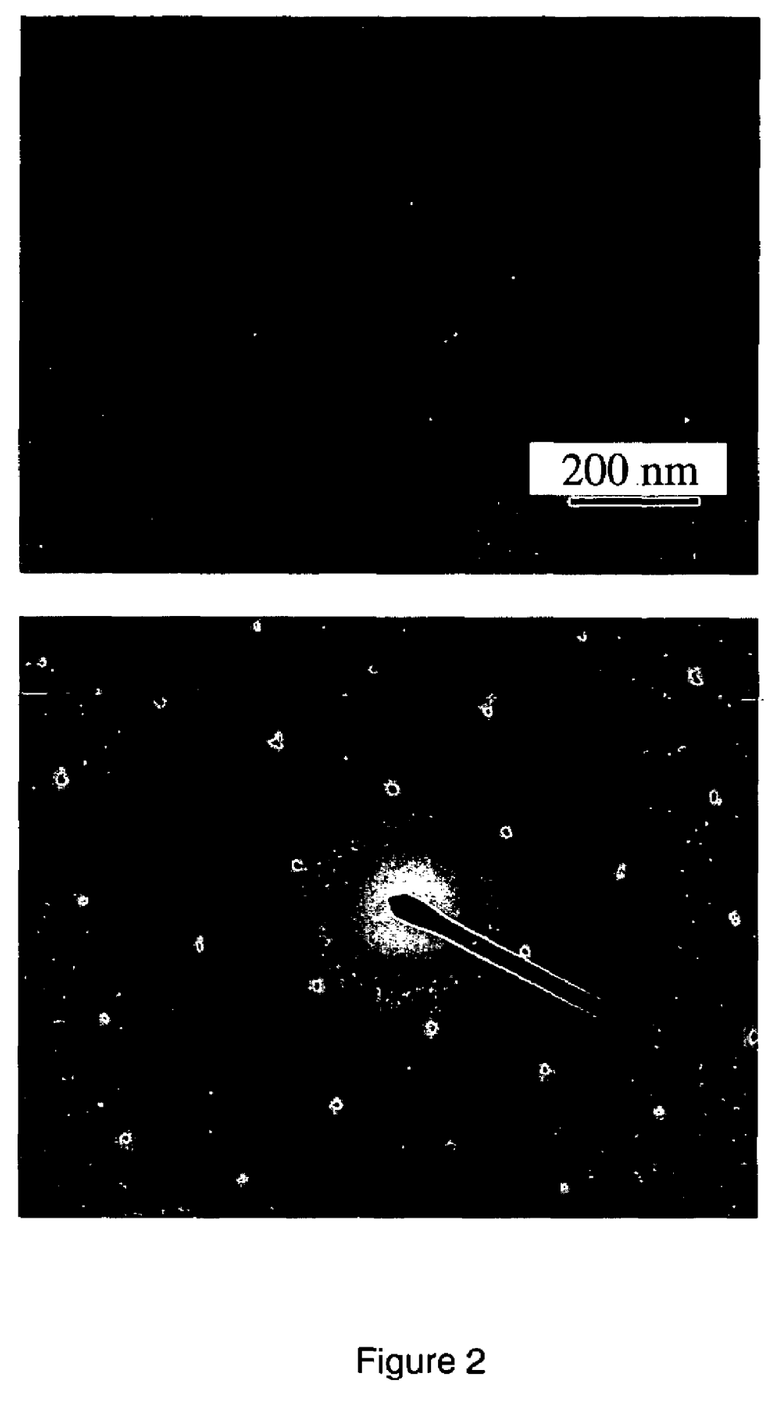
FIG. 2 represents the bright field micrograph and electron diffraction pattern of $CeTi_2O_6$ film.
Figure 3:
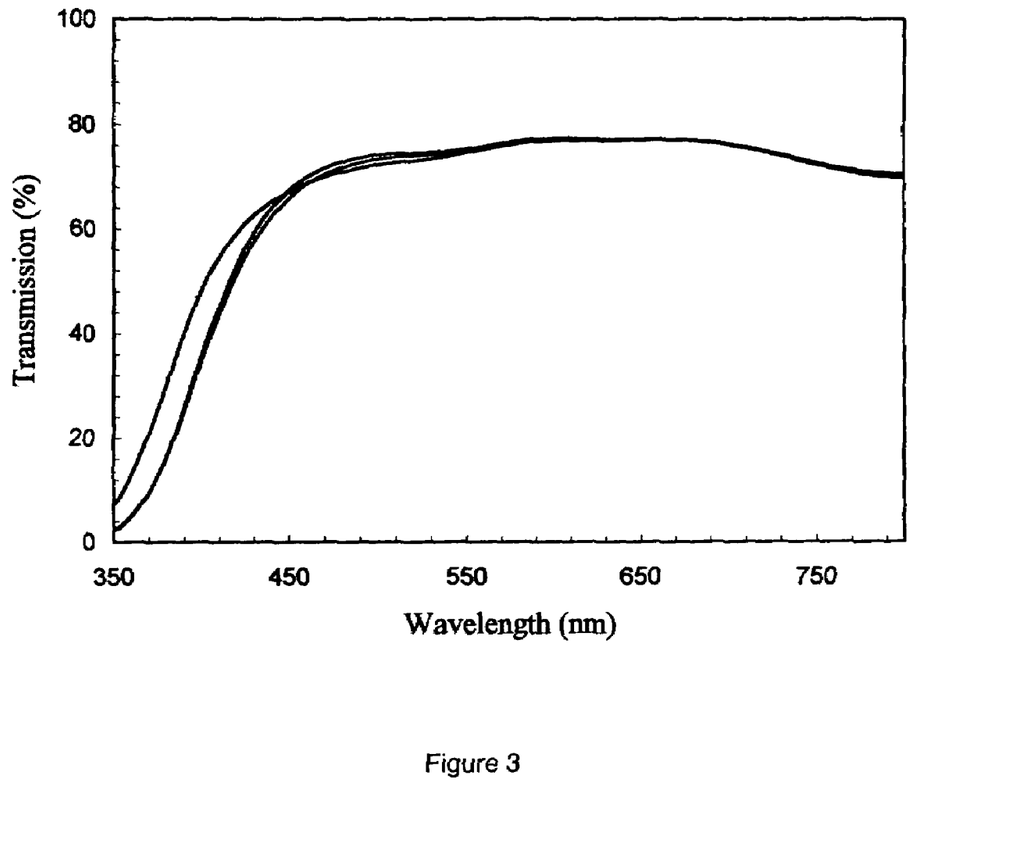
FIG. 3 represents the transmission profiles of $CeTi_2O_6$ film in the as-deposited, Li ion intercalated and Li ion deintercalated states.
Figure 4:
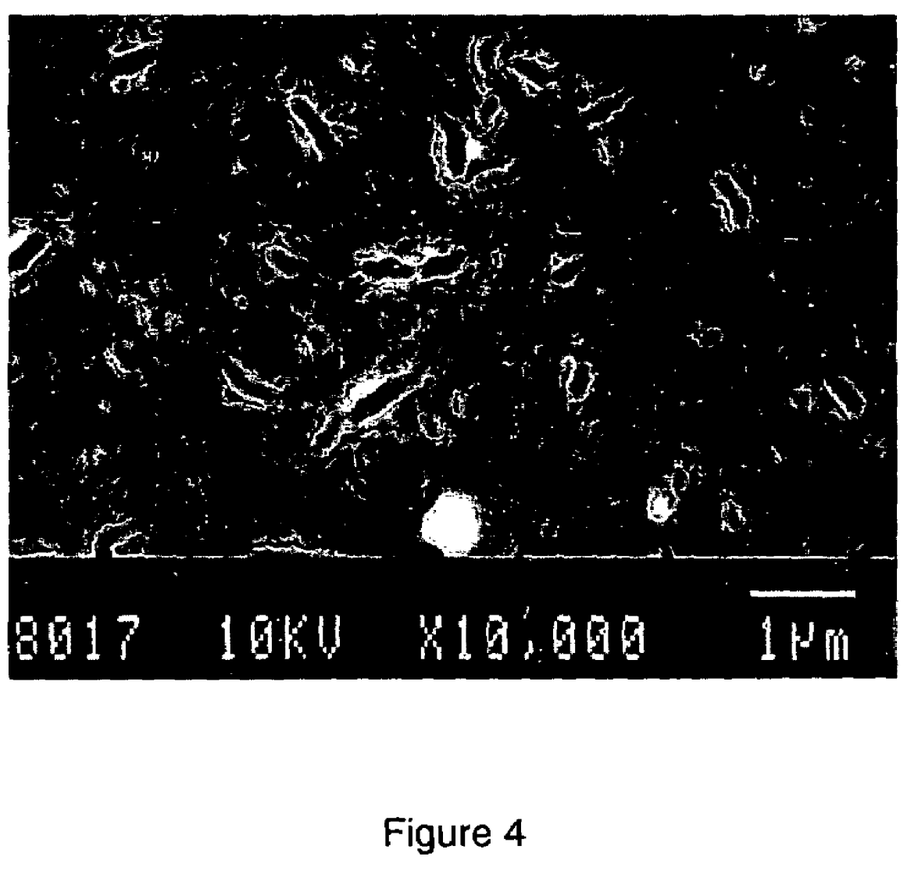
FIG. 4 represents the SEM micrograph of $CeTi_2O_6$ film.
Figure 5:
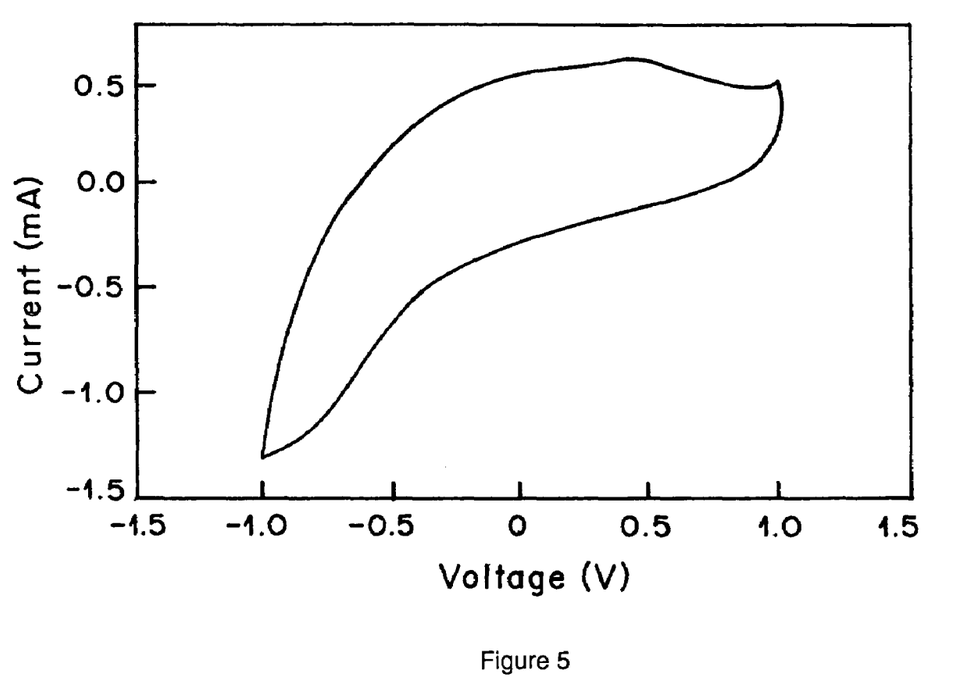
FIG. 5 represents the cyclic voltammograms of the $CeTi_2O_6$ film within the potential window of ±1.0 V at a scan rate of 20 $mVs^{-1}$.

0.22 M solution of cerium chloride heptahydrate ($CeCl_3.7H_2O$, Merck) has been prepared in absolute ethanol ($C_2H_5OH$, Merck). The above clear, colorless solution has been added to titanium propoxide such that the Ce:Ti mole ratio in the solution is 0.5:1. The resultant bright yellow solution has been stirred for 5 min. After allowing the commencement of gelation in the resultant yellow solution, the sol has been spin coated on to fluorine doped tin oxide coated glass substrates and micro slide glass substrates at 3000 rpm for 35 s followed by drying in air for 15 min. Subsequently, the films have been thermally treated at 600° C. for 5 min. in air at a heating rate of 1-2° $C.min^{-1}$. The films prepared as above with thickness 6800 Å were tested for their optical passivity in a test cell containing a test electrolyte of 1 M lithium perchlorate in propylene carbonate and a platinum electrode. The XRD results (FIG. 1) have shown the formation of pure $CeTi_2O_6$ phase in the films with an average crystallite size along (201) plane of 16 nm. The TEM studies (FIG. 2) have also affirmed the formation of monoclinic $CeTi_2O_6$ structure in the films. The films have shown a transmission modulation of less than 1% at 550 nm (FIG. 3). The transmission of the films is nearly 80% in the entire visible spectral region. The refractive index and indirect band gap of the film are 1.99 and 3.25 eV respectively. From FIG. 4 showing the SEM micrograph of the $CeTi_2O_6$ film, a pore size of nearly 250 nm is determined. Ion storage capacity of the film calculated using the cyclic voltammogram illustrated in FIG. 5 is 20.5 $mCcm^{-2}$.

EXAMPLE 2

0.22 M solution of cerium chloride heptahydrate ($CeCl_3.7H_2O$, Merck) has been prepared in absolute ethanol ($C_2H_5OH$, Merck). The above clear, colorless solution has been added to titanium propoxide such that the Ce:Ti mole ratio in the solution is 0.6:1. The resultant bright yellow solution has been stirred for 5 min. After allowing the commencement of gelation in the resultant yellow solution, the sol has been spin coated on to fluorine doped tin oxide coated glass substrates and micro slide glass substrates at 3000 rpm for 35 s followed by drying in air for 15 min. Subsequently, the films have been thermally treated at 600° C. for 5 min. in air at a heating rate of 1-2° $C.min^{-1}$. The films prepared as above with thickness 6200 Å were tested for their optical passivity in a test cell containing a test electrolyte of 1 M lithium perchlorate in propylene carbonate and a platinum electrode. The films have shown a transmission modulation of less than 1% at 550 nm. The transmission of the films is nearly 80% in the entire visible spectral region. The XRD results have shown the formation of pure $CeTi_2O_6$ phase in the films with an average crystallite size along (201) plane of 14.2 nm. The ion storage capacity of the film is 19.3 $mCcm^{-2}$.

EXAMPLE 3

0.22 M solution of cerium chloride heptahydrate ($CeCl_3.7H_2O$, Merck) has been prepared in absolute ethanol ($C_2H_5OH$, Merck). The above clear, colorless solution has been added to titanium propoxide such that the Ce:Ti mole ratio in the solution is 0.4:1. The resultant bright yellow solution has been stirred for 5 min. After allowing the commencement of gelation in the resultant yellow solution, the sol has been spin coated on to fluorine doped tin oxide coated glass substrates and micro slide glass substrates at 3000 rpm for 35 s followed by drying in air for 15 min. Subsequently, the films have been thermally treated at 600° C. for 5 min. in air at a heating rate of 1-2° $C.min^{-1}$. The films prepared as above with thickness 10,000 Å were tested for their optical passivity in a test cell containing a test electrolyte of 1 M lithium perchlorate in propylene carbonate and a platinum electrode. The films have shown a transmission modulation of less than 1% at 550 nm. The transmission of the films is nearly 80% in the entire visible spectral region. The XRD results have shown the formation of pure $CeTi_2O_6$ phase in the films with an average crystallite size along (201) plane of 4.7 nm. The ion storage capacity of the film is 23.0 $mCcm^{-2}$.

Table II shows the comparison of the parameters observed in the different films.

TABLE II

Comparison of the parameters observed in the different films.

| Ce:Ti mole ratio | Crystallite size (nm) | Ion storage capacity (mCcm$^{-2}$) | Visible transmittance (%) at 550 nm | Transmission modulation (%) at 550 nm |
|---|---|---|---|---|
| 0.4:1 | 4.7 | 23.0 | ~80 | <1 |
| 0.5:1 | 16.0 | 20.5 | ~80 | <1 |
| 0.6:1 | 14.2 | 19.3 | ~80 | <1 |

We claim:

1. A sol-gel process for the preparation of monoclinic CeTi$_2$O$_6$ thin film form, the said process comprising the steps of:

a) preparing an alcoholic solution of about 0.20-0.25 M cerium chloride heptahydrate in absolute ethanol, b) adding the solution prepared in step a) to titanium propoxide having concentration in the solution in the range of 0.331-0.624 M, followed by stirring for a period of 4-10 min and aging at 20-30° C. for a period of about one week, wherein the Ce:Ti mole ratio used is in the range of 0.4:1 to 0.6:1, c) spin coating the above said aged solution on electrically conducting substrate or micro slide glass, followed by air drying for a period of about 10-20 min. and annealing the film in air, at a temperature in the range of 580-620° C. for a period of 5-10 min. to obtain the desired monoclinic CeTi$_2$O$_6$ thin film.

2. A process as claimed in claim 1, wherein the strength of the cerium chloride heptahydrate solution is 0.22 M.

3. A process as claimed in claim 1, wherein the concentration of titanium propoxide in the solution is in the range of 0.372-0.559 M.

4. A process as claimed in claim 1 wherein the solution obtained in step b) used for making film is in the state of just commencing to become a gel.

5. A process as claimed in claim 1 wherein the aged solution used obtained in step b) is spin coated at 3000 rpm for 35 s.

6. A process as claimed in claim 1 wherein the deposited film is dried in air for 15 min.

7. A process as claimed in claim 1 wherein the film is annealed at 600° for 5 min.

8. A process as claimed in claim 1 wherein the conducting substrate used is fluorine doped tin oxide coated glass.

* * * * *